W. B. FENN.
KNIFE STRUCTURE FOR REMOVING GREEN CORN FROM THE COB.
APPLICATION FILED MAR. 20, 1915.
1,282,790.
Patented Oct. 29, 1918.
5 SHEETS—SHEET 1.
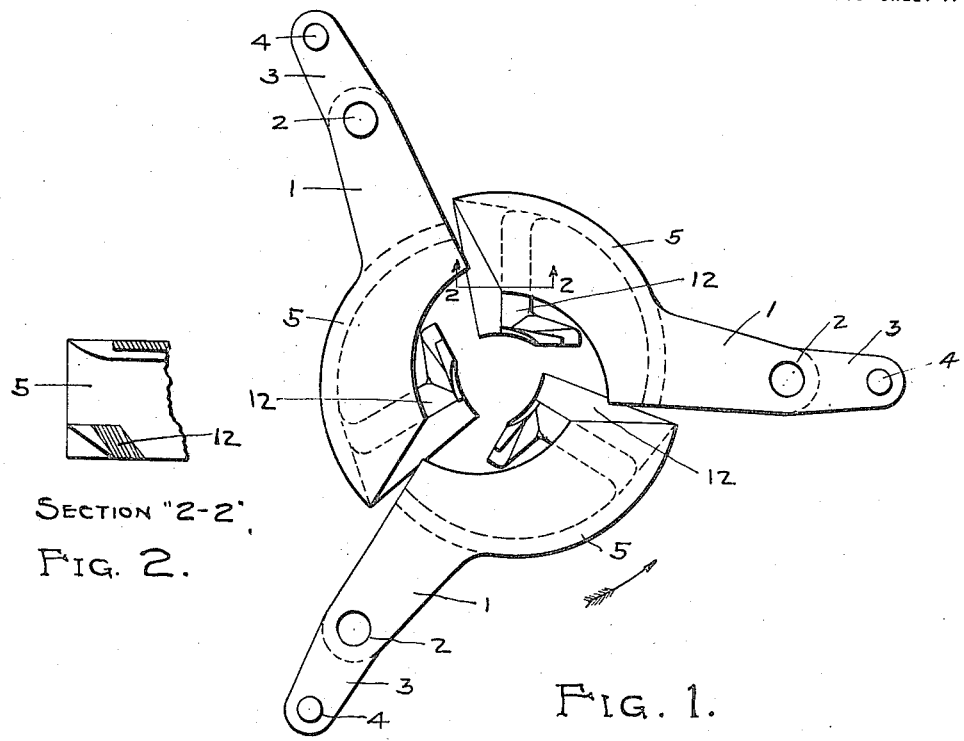
SECTION "2-2".
FIG. 2.
FIG. 1.
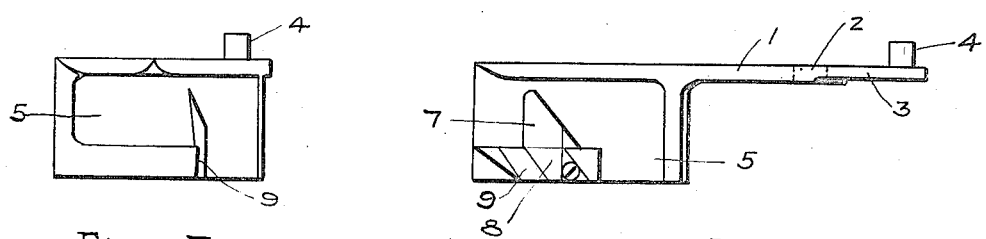
FIG. 3.
FIG. 4.
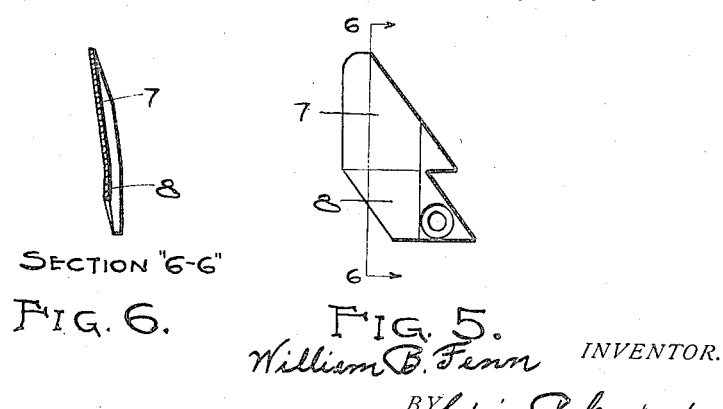
SECTION "6-6"
FIG. 6.
FIG. 5.
William B. Fenn   INVENTOR.
BY Edwin P. Corbett
ATTORNEY.

W. B. FENN.
KNIFE STRUCTURE FOR REMOVING GREEN CORN FROM THE COB.
APPLICATION FILED MAR. 20, 1915.

1,282,790.

Patented Oct. 29, 1918.
5 SHEETS—SHEET 2.

SECTION "8-8"

SECTION "9-9"

SECTION "12-12"

SECTION "13-13"

William B. Fenn INVENTOR.
BY Edwin P. Corbett
ATTORNEY.

W. B. FENN.
KNIFE STRUCTURE FOR REMOVING GREEN CORN FROM THE COB.
APPLICATION FILED MAR. 20, 1915.

1,282,790.

Patented Oct. 29, 1918.
5 SHEETS-SHEET 3.

SECTION 16-16.

SECTION 19-19.

SECTION 21-21.

William B Fenn  INVENTOR.
BY Edwin P Corbett
ATTORNEY.

W. B. FENN.
KNIFE STRUCTURE FOR REMOVING GREEN CORN FROM THE COB.
APPLICATION FILED MAR. 20, 1915.

1,282,790.

Patented Oct. 29, 1918.
5 SHEETS—SHEET 4.

William B Fenn INVENTOR.

BY

ATTORNEY.

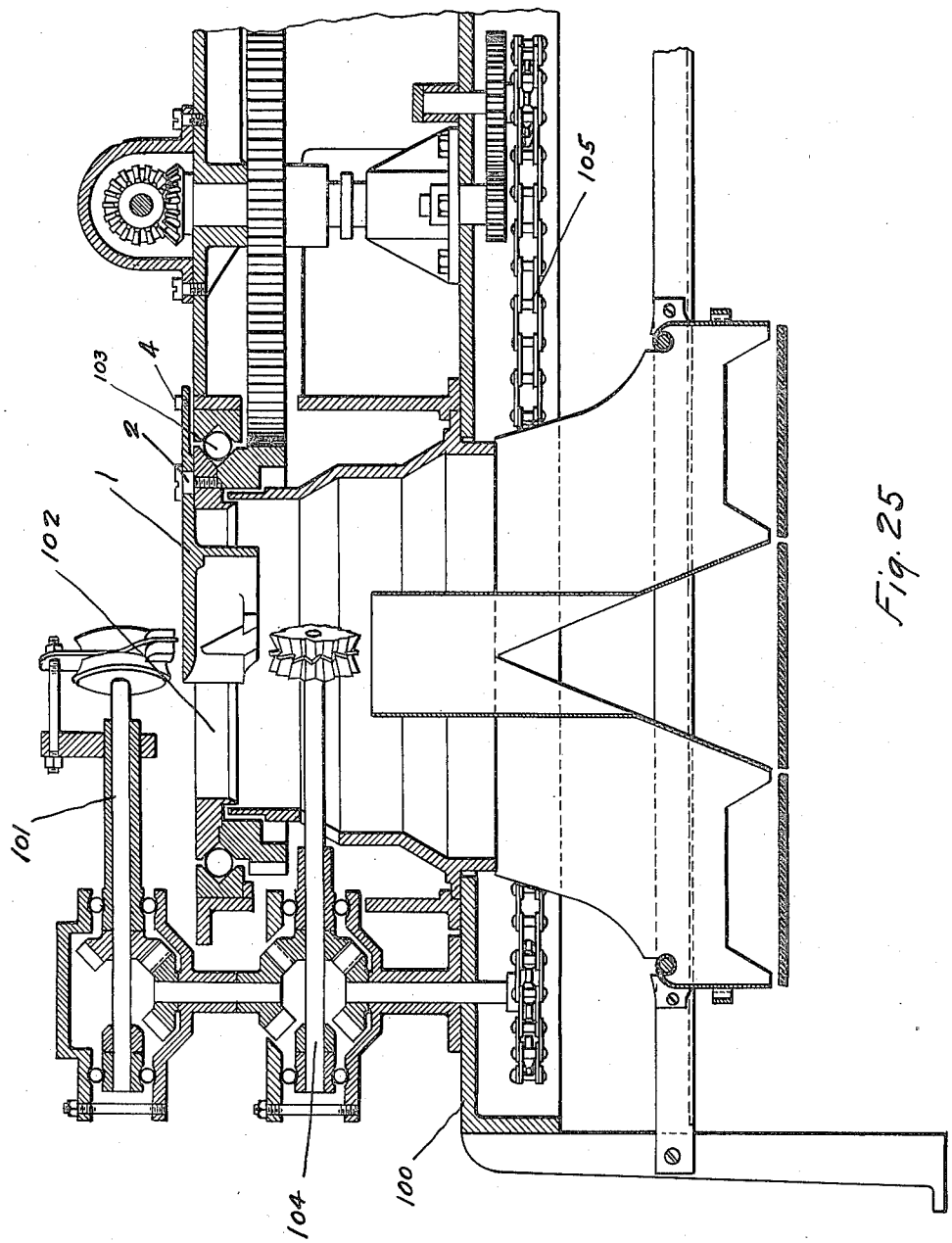

UNITED STATES PATENT OFFICE.

WILLIAM B. FENN, OF COLUMBUS, OHIO, ASSIGNOR TO WEDOIT COMPANY, OF COLUMBUS, OHIO, A CORPORATION OF OHIO.

KNIFE STRUCTURE FOR REMOVING GREEN CORN FROM THE COB.

1,282,790.      Specification of Letters Patent.      Patented Oct. 29, 1918.

Application filed March 20, 1915. Serial No. 15,863.

*To all whom it may concern:*

Be it known that I, WILLIAM B. FENN, a citizen of the United States of America, residing at Columbus, in the county of Franklin and State of Ohio, have invented certain new and useful Improvements in Knife Structures for Removing Green Corn from the Cob, of which the following is a specification.

My invention has to do with knife structure in machines for removing green corn from the cob, being disclosed in part in application, Serial No. 19,500, of April 6, 1915. I have found that the most practical way for removing green corn from the cob is by simultaneously rotating and longitudinally moving the ears of corn against stationary knives or by an equivalent operation which attains a spiral cutting action. The result that I have striven for is the removal of the kernels of corn by a "draw" cut rather than by a direct pushing of the cutting blades along the ears of corn. Certain features of my improvement may, however, be of utility in corn cutting machines of any type.

The attainment of the "draw" cut is by no means a simple matter, because various features of the product being operated upon present certain difficulties such as the constantly varying shape of the ears and the constantly varying resistance offered to the cutting action. My invention, however, resides in a peculiar knife structure designed to meet hitherto insurmountable difficulties arising from the nature of the product being treated and, by over-coming these difficulties, removing the corn from the cob regardless of the varying conditions and with a degree of efficiency rendering my machine not only commercially practical but very successful.

An ear of corn is made up of a central pith, the outer kernels and an intermediate cellular structure. It may be advisable to cut the kernels of corn as near their bases as possible and then discard the cobs, or it may be advisable to first cut a portion of each kernel from the cob and then scrape the cob to squeeze the remaining portion of each kernel thus removing the contents of the capsule which is left attached to the cellular structure. Whichever method is used, I have found that the cutting or scraping action will not regulate its own depth by the angle of the cutting or scraping blades and by the resistance offered to the cutting structure.

From my experiments, it would appear that it is an essential of a successful apparatus that a shoe having a contacting surface of definite area be provided in conjunction with the blade or blades and be of such formation that it will rest upon the intermediate cellular formation of each cob and preclude a digging-in of the cutting blade or of the scraping blade beyond a definite and predetermined degree. Whether or not this shoe is essential, it is certainly a vital feature of my improvement.

One feature of my improvement that seems equally vital comprises cutting knives which are divergent to receive the ends of the ears of corn as they are successively fed against the knives.

There are many results of these features which will later appear and there are other features of importance which will be referred to in the course of this description, with particular reference to the accompanying drawings wherein similar characters of reference designate corresponding parts and wherein:

Figure 1 is a top plan view of the assembled knife structure showing the supports and their relative location.

Fig. 2 is a section taken on line 2—2 of Fig. 1 showing a knife support in detail.

Fig. 3 is an end view of one of the knife supports with a knife mounted thereon.

Fig. 4 is a side elevation of one of the knife supports with the knife mounted thereon.

Fig. 5 is a side elevation of one of my preferred forms of knives.

Fig. 6 is a section taken on line 6—6 of Fig. 5, this section clearly illustrating the taper of the cutting edge of the knife and illustrating the lower shoe which is ground vertically straight and designed to bear upon the cob in conjunction with the concentric surface of the support immediately adjacent.

Fig. 25 is a vertical longitudinal section of the machine shown in Fig. 1, illustrating particularly the relation between the knife structure and the feeding elements.

Figure 7:
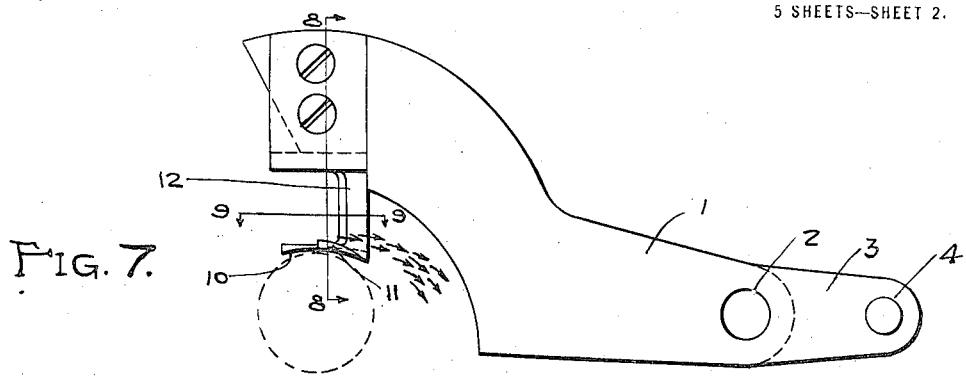
Fig. 7 is a top plan view of a modified form of knife structure and support.
Figure 8:
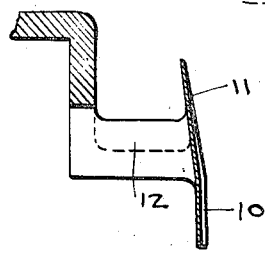
Fig. 8 represents a section taken on line 8—8 of Fig. 7.

Referring to Figs. 1, 3, 4, 5 and 6, it will appear that the knife structure comprises a plurality of knife-carrying arms 1 pivoted at 2 and having extensions 3 provided with pins 4. These pins 4 are designed to work in slots of a spring controlled ring (not shown). In these figures it is shown that the shanks of the knife carrying elements are movable about vertical fulcrums while the body portions 5 are the shape of an inverted L in cross section and are so assembled as to form a segmental cylindrical inclosure for the ears of corn which pass vertically downward therethrough. Extending inwardly from the bases of these portions 5 are supports 12 which are recessed for the reception of knife blades, these knife blades being ground on a taper from the vertical as at 7 and being ground vertically straight as at 8. These straight ground portions 8 form continuations of bearing shoes 9 and together these surfaces 8 and 9 follow the angled cutting edge 7 so as to bear upon the cellular portions of the cobs and prevent digging of the knives into the cellular portions and the piths of the cobs.

From this description it will be noted that each cob approaches the divergent blades and is readily received thereby, because of this divergence which tends to guide the resiliently mounted knives outwardly instead of permitting them to dig into the cobs. The initial action is somewhat the same as the action of a funnel in receiving and tending to center each cob. Almost immediately after the knife commences to cut, the shoe 9 and the lower portion 8 of the blade comes into contact with the cellular portion of the cob and because of this broadened surface contacting with the cob any excessive digging action is absolutely precluded.

Figs. 7 to 14, inclusive, illustrate a formation wherein the guiding shoe for preventing digging-in of the knife edges is shown at 10 as being an integral part of the cutting blade. By reference to Figs. 12, 13 and 14, it will be noted that the cutting blade 11 is inclined from the vertical while the shoe 10 and the lower portion of the cutting blade are ground vertically straight, except as to its uppermost corner which is inclined as at 35 in Fig. 12.

Figures 9, 10:
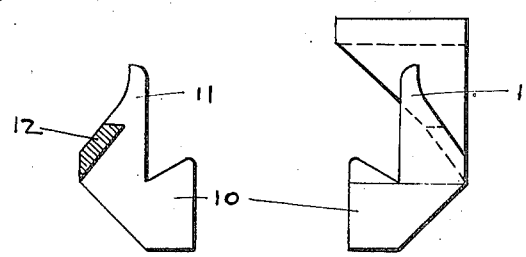
Fig. 9 is a section on line 9—9 of Fig. 7.
Fig. 10 is a side elevation looking at the knife of the structure shown in Fig. 7.
Figure 11:
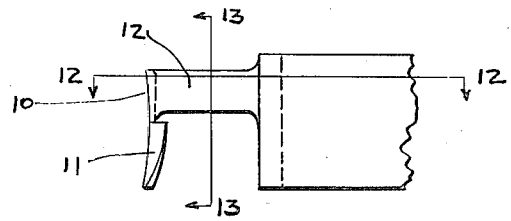
Fig. 11 is a top plan view of a further modification of the knife structure and support.
Figure 12:
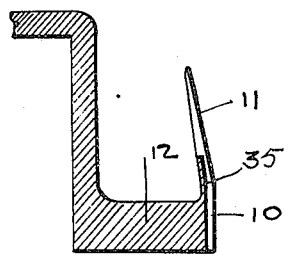
Fig. 12 is a section taken on line 12—12 of Fig. 11.
Figure 13:
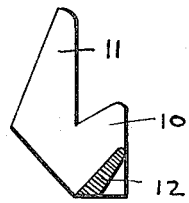
Fig. 13 is a section taken on line 13—13 of Fig. 11.
Figure 14:
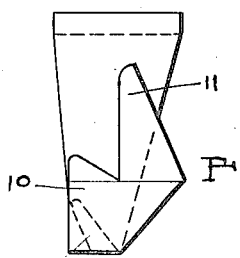
Fig. 14 is a side elevation looking at the knife structure of Fig. 11.

By reference to Figs. 2, 9, and 13 it will be noted that the actual supporting arm 12 for the knife blade is of a peculiar formation and location. In Figs. 2 and 13 it precedes the cutting edge of the knife blade while in Fig. 9 it follows the cutting edge of the knife blade. In both cases this support moves in the spiral cut of the blade which precedes it, whether this be its own blade or a blade carried by another support; or, to put it in another way, the lower edge of each support is mounted within the lower edge of the cutting path in which it moves.

It is of importance to note that these supports are designed for the steepest possible pitch of spiral cut as distinguished from a mean pitch.

The shapes of the support and the knife are such that the flow of the severed kernels of corn downward is unimpeded but is slightly guided outwardly away from the cob with sufficient accuracy that practically none of the kernels are plastered upon adjacent and surrounding surfaces of the machine. By arrows in Fig. 7, I have shown how the kernels are guided slightly outward away from the cob.

Figure 15:
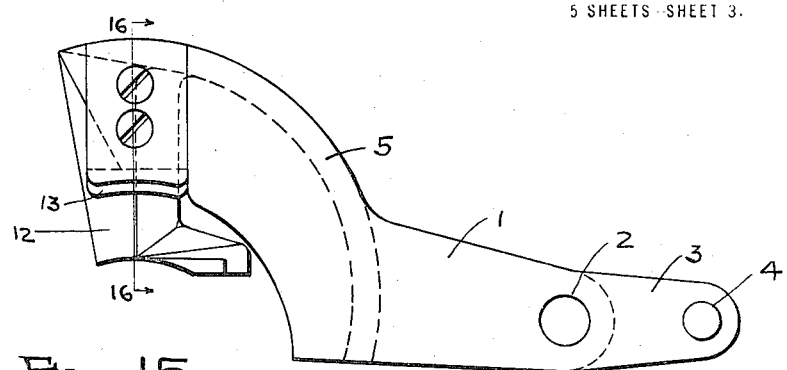
Fig. 15 is a plan view of a modified form of knife and support wherein a supplemental shoe designed to bear upon the kernels of the ear is utilized.
Figures 16, 17:
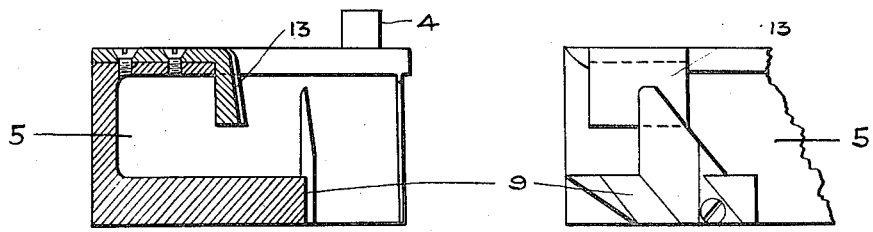
Fig. 16 is a section taken on line 16—16 of Fig. 15.
Fig. 17 is a side elevation looking at the knife side of the structure shown in Fig. 15.

The structures shown in Figs. 15, 16, and 17 are notable because of the supplemental shoe 13 which is so located that it precedes the cutting knife and bears upon the outer surfaces of the uncut kernels to prevent digging-in of the knives which may be either vertical or inclined from the vertical. A vertical knife is shown in Figs. 18 and 19.

Figure 22:
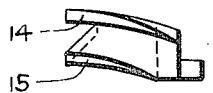
Fig. 22 is a top plan view of the knife structure shown in Figs. 20 and 21.
Figures 20, 21:
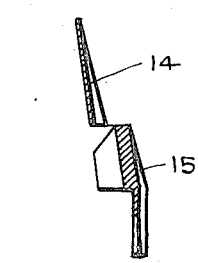
Fig. 20 is a side elevation of a combined knife and scraping blade which may be utilized by me in cutting a portion of the kernels and then scraping the cob.
Fig. 21 is a section taken on line 21—21 of Fig. 20.

A further modification of my improvement is illustrated in Figs. 20, 21, and 22 and consists in a compound knife structure embodying a cutting blade 14 preferably mounted at an angle from the vertical, and an integrally formed scraper blade 15 following in the path of the knife blade and squeezing the bases of the kernels out of their capsules, and a lower straight ground portion shaped to form the continuation of a guiding shoe. This forming of a knife blade and scraping blade in one piece is new in itself and it is also believed to be new to combine a knife blade, scraping blade and a shoe of the nature defined.

One vital feature of my invention arises from the fact that all the blades used by me are designed to have a radius for a maximum sized cob as distinguished from a mean sized cob.

Figures 18, 19, 23:
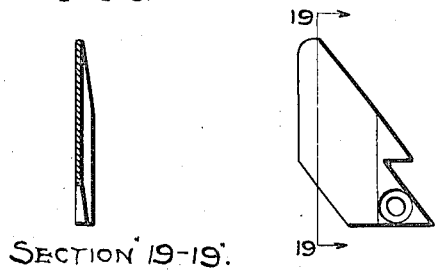
Fig. 18 is a detached view in side elevation of the knife shown in Figs. 15, 16, 17.
Fig. 19 is a section taken on line 19—19 of Fig. 18.
Fig. 23 is a perspective of a compound knife and scraper supplemented by a guide for the scraper as well as for the knife.

A further modification of a compound knife and scraper is shown in Fig. 23. In this figure there is provided a cutting blade 14 and a scraper blade 15 and a guide 25 is provided for the cutting blade in the form of a broad-surfaced shoe and a guiding surface 25 is provided for contacting the cob to regulate the depth of the scraping action. This device first cuts a portion of the kernel and the depth of this cut is regulated by the shoe 25 bearing upon the cut corn still remaining on the cob. Then the scraper squeezes out the bases of the kernels and the depth of this scraping action is regulated by the shoe 26.

It will be understood in this case that the use of the word "tangent" and the phrase "movable along the radii of the ears being fed" are intended to have a reasonably broad interpretation so as to include substantial equivalents, inasmuch as the present form of knife arm will result in some slight deviation from the tangent point.

Figure 24:
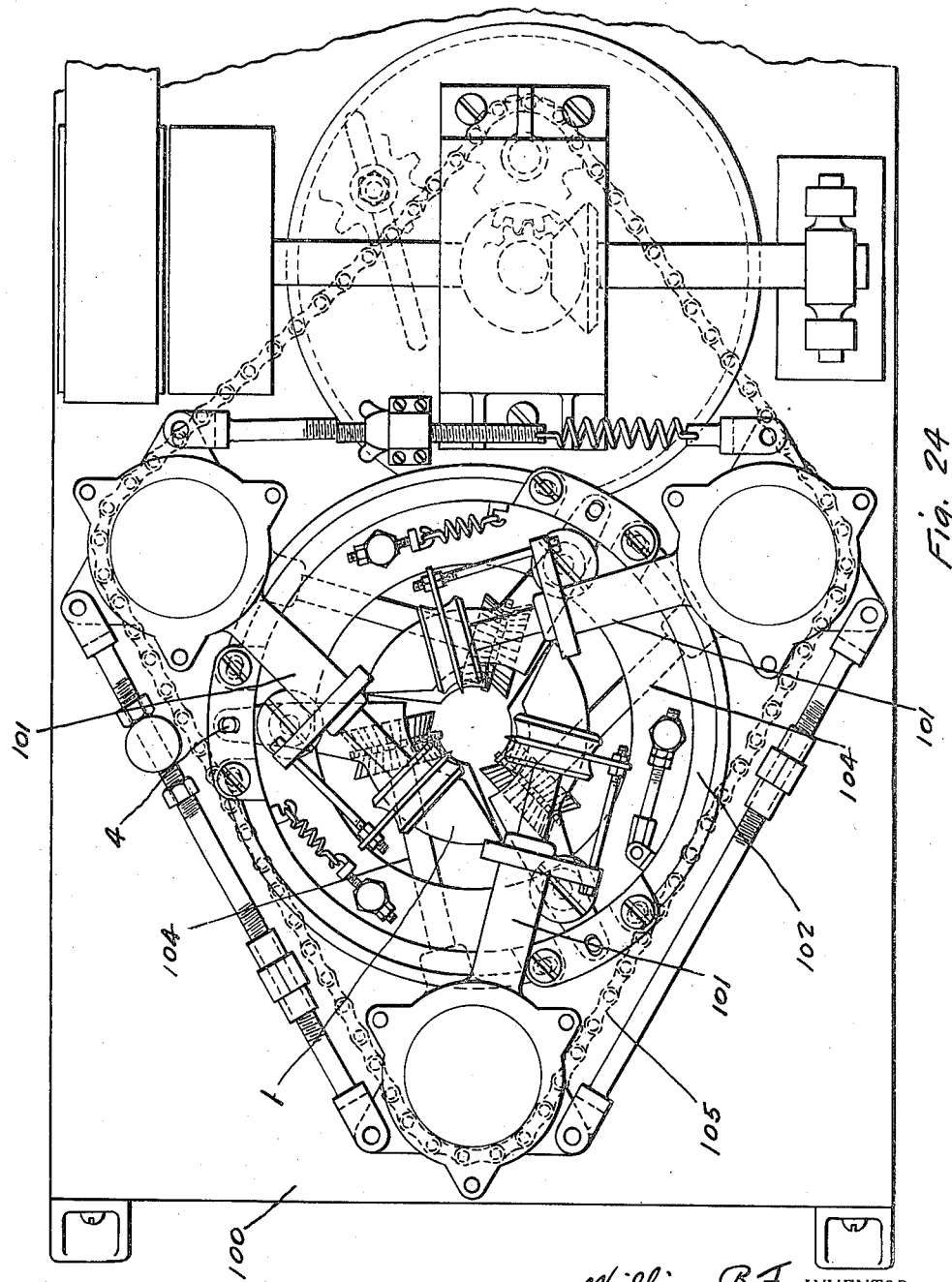
Fig. 24 is a top plan view of a special cutting machine illustrating the application of the improved knife structure.

Figs. 24 and 25 illustrate one form of a spiral cutting machine wherein this improved knife structure may be utilized. A base plate 100 is provided and mounted thereon are the upper feed units 101 for feeding the ears to the knife structure 102. The knife structure 102 is positioned directly beneath the upper feed units 101 and is mounted upon the ball bearing 103 which is suitably supported upon the base plate 100. Suitable gearing is provided to bodily rotate the knife structure 102 about the longitudinal axis of the ears being fed therethrough by the upper feeding unit 101. Positioned directly beneath the knife structure 102 are the lower feeding units 104, constructed to engage and feed the cobs after their passage through the knife structure. The upper and lower feed units 101 and 104 are pivotally mounted to accommodate the various sizes of the ears of corn to be operated upon; also, these units are alined to be suitably geared together to insure synchronous rotation for feeding the ears through the knife structure. A chain 105, driven by the gearing which drives the knife structure 102, is provided to synchronously drive each of the sets of feed units.

Applicant does not care to be limited to the spiral cutting machine herein illustrated and described, as his improved knife structure is applicable to other forms of spiral cutting machines. For instance, it is applicable in a machine wherein the ears of corn are longitudinally fed and simultaneously rotated, while the knife structure is non-rotatable. Furthermore, there are many elements of this invention, application of which is not confined to the spiral cutting type of machine.

In operation, the ears of corn are introduced to the upper feeding unit 101, which grasps them at spaced locations circumferentially, and being rotated passes them to the knife structure 102. The knife structure 102 is rotated and resiliently yieldable to conform to the varying size ears and the knife elements are constructed to sever the kernels. The depth of the severing action is regulated by the gage shoes which bear upon the cob. The combination of the longitudinal feed with the rotation of the knife structure results in the knife elements moving in a spiral path about the ears being fed. Immediately upon passing through the knife structure 102 the cobs are under subjection to the lower feed units 104 which pass them out of the machine.

Having thus described my invention what I claim is:

1. In a machine for cutting corn from the cob, cutting knives, and knife supports, said knives and supports being shaped to guide the knife edges at definite tangents in relation to the cob.

2. In a machine for cutting green corn from the cob, cutter knives resiliently mounted and so set as to contact with the cob, and a gage to preclude excessive digging into the cob.

3. In a machine for cutting green corn from the cob by a rotary cutting action, cutter knives rotatable with relation to the ears of corn upon which they operate, and gages bearing upon the cobs for limiting the depth of cut, and means for feeding the ears longitudinally.

4. In a machine for cutting green corn from the cob by a rotary cutting action, cutter knives rotatable with relation to the ears of corn upon which they operate, and elements having contacting surfaces directly below the cutting edges of said knives for bearing on the cob and gaging the depth of cut, and means for feeding the ears longitudinally.

5. In a machine for cutting green corn from the cob by relatively rotating knives knife arms resiliently held inward, knife blades on said arms with their cutting edges of a form to remain substantially in a radial plane of the ears passing through the knife arms, the direction of cut of said knife blades being along the cob surface, and gages bearing upon the cob to limit the depth of cut.

6. In a machine for cutting green corn from the cob by relatively rotating knives, knife arms resiliently held inward, knife blades on said arms with their cutting edges of a form to remain substantially in a radial plane of the ears passing through the knife arms, the direction of cut of said knife blades being along the cob surface, and the knife arm structure being formed with a clearance to permit said blades to cut to the cob.

7. In a machine for cutting green corn from the cob by relatively rotating knives, a resilient knife structure formed and positioned to sever all of the kernels at their bases on all sizes and shapes of ears passing through the machine, and gages for precluding digging into the cobs.

8. In a machine of the class described, means for feeding ears of corn, relatively rotatable knives to which said ears are fed, and cob-bearing gages carried by said knives shaped to clear maximum-size cobs at all but bearing points.

9. In a machine of the class described, means for feeding ears of corn, relatively rotatable knives to which said ears are fed, and cob-bearing gages carried by said knives with extensions shaped to clear maximum-size cobs.

10. In a machine of the class described, a cutter knife, and a cob-bearing guard on said knife located in front of its cutting edge.

11. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and said blades being so mounted that the cutting edges of the blades will operate tangent to all the cobs, gages for bearing on the cobs in line with such tangents, extensions fore and aft of said gages with their inner surfaces formed to clear maximum-size cobs, said knives being divergent and having their non-cutting portions shaped to clear the un-cut corn left when the steepest spiral is being cut.

12. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and blades being so mounted that the cutting edges of the blades will operate tangent to all of the cobs, gages for bearing on the cobs in line with such tangents, extensions fore and aft of said gages with their inner surfaces formed to clear maximum-size cobs said knives being divergent.

13. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and said blades being so mounted that the cutting edges of the blades will operate tangent to all the cobs, gages for bearing on the cobs in line with such tangents, and extensions fore and aft of said gages with their inner surfaces formed to clear maximum-size cobs.

14. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and said blades being so mounted that the cutting edges of the blades will operate tangent to all the cobs, gages for bearing on the cobs in line with such tangents, and extensions on said gages.

15. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and blades being so mounted that the cutting edges of the blades will operate tangent to all the cobs, and gages for bearing on the cobs in line with such tangents.

16. In a machine for cutting green corn from the cob, means for feeding the ears successively to relatively rotating knives, knife arms resiliently held inward, knife blades on said arms, said blades having their inner surfaces shaped to clear maximum-size cobs, said knife arms and blades being so mounted that the cutting edges of the blades will operate tangent to all the cobs.

17. A machine for cutting green corn from the cob comprising an ear-feeding means, a relatively rotatable knife, and a relatively rotatable scraper blade constructed and mounted to operate tangent to the varying size cobs.

18. A machine for cutting green corn from the cob comprising an ear-feeding means, a relatively rotatable knife, a relatively rotatable scraper blade operable tangent to the varying size cobs, and a relatively rotatable gage bearing upon the cob to limit the depth of cut.

19. A machine for cutting green corn from the cob comprising ear-feeding means, relatively rotatable means for cutting, scraping and gaging in the order named.

20. A machine for cutting green corn from the cob comprising ear-feeding means, a cutting knife, a scraper blade, and a gage all relatively rotatable and constructed and mounted to operate on the tangents of the varying size cobs.

21. A machine for cutting green corn from the cob comprising ear-feeding means, a cutting knife, a scraper blade, and a gage, all relatively rotatable and in alinement and constructed and mounted to operate on the tangents of the varying size ears.

22. A machine for cutting green corn from the cob comprising ear-feeding means, a relatively rotatable knife, and a divergent scraper.

23. A machine for cutting green corn from the cob comprising ear-feeding means and relatively rotatable cutting knives, and supporting means therefor, constructed to direct the cut kernels slightly outward while permitting free downward flow.

24. A machine for cutting green corn from the cob comprising ear-feeding means and relatively rotatable cutting knives, and knife supports within the spiral path of the blades which precede them.

25. A machine for cutting green corn from the cob comprising ear-feeding means, relatively rotatable cutting knives, and supporting means for such knives shaped and located to direct and permit movement of the cut kernel downward.

26. A machine for cutting green corn from the cob comprising ear-feeding means, a relatively rotatable divergent severing element, and a straight cob-bearing gage.

27. In a machine for cutting green corn from the cob, a relatively rotatable knife blade whose cutting edge is substantially straight to sever the kernels from the varying size ears.

28. In a machine for cutting green corn from the cob by a spiral cutting action, means for feeding the ears longitudinally, and relatively rotatable blades of such shape and so positioned in relation to the ears being presented that each part of the cutting edges severs the kernels with a draw cut.

29. A machine for cutting green corn from the cob comprising relatively rotatable cutting blades, said blades having a rectilinear cutting edge operative substantially along a radius of the ears.

30. A machine for cutting green corn from the cob comprising relatively rotatable knife blades, said blades having a rectilinear cutting edge positioned longitudinally of the ears and operative substantially along the radius of said ears.

31. A machine for cutting green corn from the cob comprising upper feeding means yieldable to conform to the ears, lower feeding means yieldably gripping the cobs, knife structure comprising yieldable knives carrying cob-gripping shoes.

In testimony whereof I hereby affix my signature.

WILLIAM B. FENN.